3,282,960
PROPYLENE MONOTHIOCARBONATE AND PROCESSES FOR MAKING AND USING THE SAME
Edward Broderick, Perkasie, Pa., and José Luis Villa, Cream Ridge, N.J., assignors to Thiokol Chemical Corp., Bristol, Pa., a corporation of Delaware
No Drawing. Filed Sept. 29, 1964, Ser. No. 400,251
10 Claims. (Cl. 260—327)

This application is a continuation-in-part of our prior pending application Serial No. 226,716 filed September 27, 1962, now abandoned.

This invention relates to a novel process for the preparation of propylene sulfide as well as to a novel compound, propylene monothiocarbonate, from which propylene sulfide is readily obtainable and to a process of making propylene monothiocarbonate.

Propylene sulfide is an important compound useful in the formation of homopolymers and copolymers, and as an intermediate in the production of other chemical substances. The use of propylene sulfide in commercial applications, however, has been limited because of technical and economic disadvantages in the methods known for its preparation. Some disadvantages of known processes are the use of large quantities of expensive reactants, low yield, and undesired polymerization of substantial portions of the propylene sulfide product. To avoid the problem of premature polymerization of propylene sulfide, it is desirable to have an intermediate compound which is stable in storage from which propylene sulfide can be simply and economically prepared.

Accordingly, an object of the present invention is to provide an improved process for the preparation of propylene sulfide in high yields. It is another object of this invention to provide a novel compound, propylene monothiocarbonate, which is inexpensive to make and stable in storage, and from which propylene sulfide can be produced readily in a commercially feasible manner. Other objects of the invention will be in part obvious and in part pointed out hereafter.

It has unexpectedly been found, according to the present invention, that propylene sulfide is obtainable in high yields by heating propylene monothiocarbonate, a novel liquid intermediate compound, to moderate temperatures either with or without a catalyst. The propylene monothiocarbonate can be prepared by the reaction of propylene oxide and carbonyl sulfide in the presence of certain basic catalysts.

In accordance with one aspect of the invention, propylene monothiocarbonate is prepared by reacting propylene oxide and carbonyl sulfide in the presence of a suitable catalyst at a temperature between 30° and 90° C., preferably between 60° and 90° C. The catalyst may be used in amounts of about 0.4 to 6% by weight based on the propylene oxide charge. The reaction proceeds to completion ordinarily within four to twenty hours depending upon the reaction conditions, the proportions of the reactants and the catalyst used. Shorter or longer reaction times may be used in particular cases.

Catalysts that have been found suitable are basic compounds of the formula:

$$M(OR)_n$$

wherein R is hydrogen, a lower alkyl group or an aromatic group, M is an alkali metal or alkaline earth metal, and $n$ is 1 or 2. Thus R may be an alkyl group such as methyl, ethyl, propyl, isopropyl or hexyl or an aromatic group such as phenyl, methylphenyl or phenylmethyl. M may be either an alkali metal or alkaline earth metal, e.g., sodium, potassium, lithium, barium, or calcium. It is evident that when M is an alkali metal, $n$ equals 1; whereas when M is an alkaline earth metal, $n$ equals 2. The preferred catalyst is sodium methoxide.

The reaction of propylene oxide and carbonyl sulfide is preferably conducted with the reactants in the liquid phase. Because of the volatility of the reactants, pressures above atmospheric pressure are generated when the reaction is carried out at temperatures in the upper part of the temperature range indicated above. However, pressure has no apparent effect on the yields of propylene monothiocarbonate obtainable. When a closed reaction system is employed, the autogenous pressure in the reactor is ordinarily used. In the event a higher pressure is desired, an inert gas such as nitrogen may be introduced into the reactor to increase the reaction pressure. Lower operating pressures may be obtained either by conducting the reaction at low temperature in an open system, or at higher temperatures in a closed system in the presence of an inert solvent with a relatively low volatility, for example, tetrahydrofuran or dioxane. Such a solvent, or combination of solvents, may be used in amounts preferably up to about one-third the weight of the total carbonyl sulfide charge.

Propylene oxide and carbonyl sulfide react in a mol to mol ratio. However, in order to achieve a faster and more nearly complete reaction, it is desirable to use an excess amount of carbonyl sulfide. The preferred molar amount of carbonyl sulfide is up to about twice the number of mols of propylene oxide charge. The excess amount of carbonyl sulfide also serves as a solvent or cosolvent for the reaction mixture.

It is important to note that no more than trace quantities of impurities are tolerable in the reaction system. Thus, in order to obtain optimum yields of propylene monothiocarbonate it is desirable to remove impurities such as water, hydrogen sulfide and carbon dioxide from the reactants, solvents and inert gases before they are charged to the reaction system.

The order in which the reactants are charged to the reactor is important because of the tendency of propylene oxide to polymerize in the presence of strongly basic catalysts. Therefore, propylene oxide should be introduced into the reactor after the carbonyl sulfide, catalyst and solvents, if any, have been charged to the reactor and the reactor heated to nearly the desired reaction temperature.

Propylene monothiocarbonate, the intermediate product, is a liquid material which has the structure

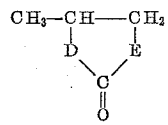

wherein D and E are selected from different members of the group consisting of sulfur and oxygen. The isomer wherein D is oxygen and E is sulfur is believed to predominate in the product mixture produced by the propylene oxide and carbonyl sulfide reaction. However, the yield of propylene sulfide obtainable from the propylene monothiocarbonate does not appear to depend upon which isomeric form is used. The liquid product obtained by the present process has a boiling point of 42°–43° C. at a pressure of 0.1 mm. absolute.

Propylene sulfide can be prepared by heating propylene monothiocarbonate at between about 140° and 210° C., preferably between 180° and 210° C., whereupon it decomposes to give propylene sulfide and carbon dioxide. The reaction may be conducted in a simple distillation vessel. The carbon dioxide side product may be vented or collected as desired. Propylene sulfide obtained from the reaction may be purified by distillation. The heating of propylene monothiocarbonate preferably is conducted in the presence of a basic catalyst. Catalysts which have been found suitable include potassium carbonate, sodium methoxide, sodium hydroxide, sodium phosphate, sodium acetate and sodium borate.

The following examples, which are set forth to illustrate the preparation of propylene monothiocarbonate and propylene sulfide, are not intended to limit in any way the scope of the present invention.

*Example 1.*—A pressure reactor was charged with 3 grams of sodium methoxide slurried with 15 grams of tetrahydrofuran, and 176 grams (2.93 mols) of carbonyl sulfide. The reactor was then sealed and heated to 56° C. with stirring, whereupon 116 grams (2 mols) of propylene oxide were introduced into the reactor. During the 25 minute interval subsequent to the propylene oxide addition, the temperature rose to 80° C. and the pressure increased autogenically from 202 to 320 p.s.i.g. The reaction mixture was allowed to stand with stirring for about 19 hours without further heating. At the end of this period, the temperature and pressure were 27° C. and 130 p.s.i.g., respectively, whereupon the pressure was vented and the reactor was opened. Propylene monothiocarbonate, a faintly yellow liquid, in the amount of 137.4 grams was obtained as a product from the reactor. The yield of propylene monothiocarbonate was 58.1% of the theoretical calculated yield. Duplicate analyses showed the product contained 27.5% sulfur.

Propylene monothiocarbonate, in the amount of 20 grams, was heated at 180-200° C. in the presence of potassium carbonate to produce carbon dioxide and propylene sulfide. The propylene sulfide was distilled to obtain 4.7 grams of a slightly yellow liquid product which was 99.2% pure. The yield of purified propylene sulfide was 37.6% based on the amount of propylene monothiocarbonate used.

*Example 2.*—A pressure reactor was charged with 4 grams of sodium methoxide slurried in a mixture of 6 grams of methanol and 60 grams of tetrahydrofuran, and 180 grams (3 mols) of carbonyl sulfide. The reactor was sealed and heated to about 64.° C.; pressure rose autogenically to 300 p.s.i.g. Over a 22 minute interval, 116 grams (2 mols) of propylene oxide were introduced into the reactor. Temperature and pressure decreased to 56° C. and 190 p.s.i.g., respectively. The reaction mixture was stirred for 15 minutes without further heating. No change in temperature was observed during that period. Heating was resumed for two hours at such a rate that the temperature rose to from 72° to 83° C. while the pressure increased to between 250 and 286 p.s.i.g. The reaction mixture was allowed to cool for 17 hours at the end of which time the temperature and pressure were 20° C. and 98 p.s.i.g., respectively.

Heating was resumed for 5.5 hours at such a rate that the temperature rose to from 76° to 81° C., and pressure increased to between 265 and 287 p.s.i.g. The reaction mixture was allowed to cool overnight, the reactor was then vented and opened. The reaction products from the reactor were washed with water and dried over $MgSO_4$ to give a crude reaction product of 117.4 grams which repesented a yield of 49.7% based on the molar amount of propylene oxide charge. In order to purify the crude reaction product, it was distilled at between 54° to 58° C. at 0.2 to 0.4 mm. of mercury pressure absolute. A faintly yellow liquid, propylene monothiocarbonate, was obtained which contained 28.4% sulfur.

Propylene sulfide was obtained by heating 15 grams of propylene monothiocarbonate as thus produced at between 140° and 190° C. in the presence of 0.5 gram of sodium methoxide. Chromatographic analysis indicated the propylene sulfide was 96.7% pure.

*Example 3.*—Propylene monothiocarbonate was prepared using a procedure similar to that described in Example 2. The reactor was charged with 7 grams of sodium methoxide slurried in 6 grams of methanol and 60 grams of tetrahydrofuran, 116 grams (2 mols) of propylene oxide and 190 grams (3.17 mols) of carbonyl sulfide. Propylene monothiocarbonate thus prepared was heated in the presence of basic catalysts such as sodium methoxide and potassium carbonate. Good yields of propylene sulfide were obtained.

*Example 4.*—A pressure reactor was charged with 4 grams of sodium methoxide dissolved in 10 grams of methanol, and 170 grams (2.83 mols) of purified carbonyl sulfide. The reactor was sealed and heated to 54° C.; the pressure rose autogenically to 340 p.s.i.g. Heating was discontinued and 116 grams (2 mols) of propylene oxide were introduced into the reactor over a 22 minute interval. During the addition of propylene oxide, the temperature in the reactor increased from 56° to 63° C. and the pressure decreased from 320 to 225 p.s.i.g. The reaction mixture was then heated for three hours at from 58° C. and 217 p.s.i.g. to 82° C. and 289 p.s.i.g. By means of an ice-bath, the reactor was cooled to 40° C. and 180 p.s.i.g., vented to relieve the pressure and opened. Water was used to wash the reaction mixture which was then dried over $MgSO_4$. The crude reaction product mixture of 105.1 grams thus obtained contained 26.13% sulfur. The yield was 44.5%.

Eighty grams of the crude reaction product mixture were distilled at from 58° C. and 0.28 mm. of mercury pressure absolute to 67° C. and 0.32 mm. Hg. The following fractions were obtained by the distillation:

(1) Propylene monothiocarbonate, a yellow liquid, in the amount of 26.5 grams which contained 27.26% sulfur and had a Refractive Index of $n_D^{25}=1.4982$;

(2) A colorless liquid in the amount of 4.8 grams collected in a Dry Ice trap which gas chromatography analysis showed contained 85.35% monomeric propylene sulfide;

(3) A residue of 45.2 grams.

A test tube equipped with a delivery tube, nitrogen flow tube and a fume tube leading to a flask in a Dry Ice bath was submerged in an oil bath maintained at 230° C. The test tube contained 1 gram of potassium carbonate. Ten grams of propylene monothiocarbonate prepared by the method described above were added dropwise to the test tube through the delivery tube. After two and one-half hours 2.5 grams of liquid propylene sulfide, 71.07% pure, were collected in the flask. The yield of propylene sulfide was 39.87% based on the molar amount of propylene monothiocarbonate charged into the test tube.

It should be apparent from the foregoing examples that the present invention provides an improved process for preparing propylene sulfide from the novel, intermediate compound, propylene monothiocarbonate. It is to be understood of course that the foregoing examples are illustrative only and that numerous changes can be made in the ingredients, proportions and conditions specifically set forth therein without departing from the spirit of the invention as set forth in the appended claims.

We claim:

1. A method of making propylene monothiocarbonate which comprises reacting propylene oxide and carbonyl sulfide at a temperature between about 30° C. and 90° C. in the presence of a basic catalyst of the formula $$M(OR)_n$$

wherein R is selected from hydrogen and alkyl and aryl radicals having 1 to 6 carbon atoms, M is selected from the alkali and alkaline earth metals and $n$ is selected from the integers 1 and 2, and recovering propylene monothiocarbonate from the reaction products.

2. A method according to claim 1 and wherein said catalyst is sodium methoxide.

3. A method according to claim 1 and wherein said propylene oxide and carbonyl sulfide are reacted under autogenous pressure at a temperature of 60° to 90° C.

4. A method according to claim 1 and wherein said propylene oxide and carbonyl sulfide are reacted in a solvent medium which is tetrahydrofuran at a temperature of 60° to 90° C.

5. A method according to claim 1 and wherein the propylene monothiocarbonate produced is heated at a temperature of 140° to 210° C. to form a mixture of propylene sulfide and carbon dioxide and the propylene sulfide is separated from said mixture.

6. A method according to claim 5 and wherein said propylene monothiocarbonate is heated in the presence of a basic catalyst.

7. A method according to claim 1 and wherein the propylene monothiocarbonate produced is heated at a temperature between 140° and 210° C. to form propylene sulfide and carbon dioxide, and said propylene sulfide is recovered as a product.

8. A method according to claim 7 and wherein said propylene monothiocarbonate is heated in the presence of a basic catalyst.

9. A method according to claim 8 and wherein said basic catalyst is potassium carbonate.

10. A method according to claim 8 and wherein said basic catalyst is sodium methoxide.

References Cited by the Examiner

UNITED STATES PATENTS

| | | | |
|---|---|---|---|
| 2,828,318 | 3/1958 | Reynolds | 260—327 |
| 3,073,846 | 1/1963 | Millikan | 260—327 |

FOREIGN PATENTS 876,018    5/1953    Germany.

OTHER REFERENCES

Conant: The Chemistry of Organic Compounds, MacMillan Co., New York (1947), page 264.

Durden et al.: J. Org. Chem., vol. 26 (1961), pp. 836–9.

Etlis et al.: Zhur. Obshch. Khim., vol. 32 (September 1962), pp. 2940-3.

WALTER A. MODANCE, *Primary Examiner.*

J. A. PATTEN, *Assistant Examiner.*